June 23, 1970 — E. P. BROGLIO — 3,516,869
DEFERRED-ACTION BATTERY
Filed Dec. 13, 1968 — 2 Sheets-Sheet 1
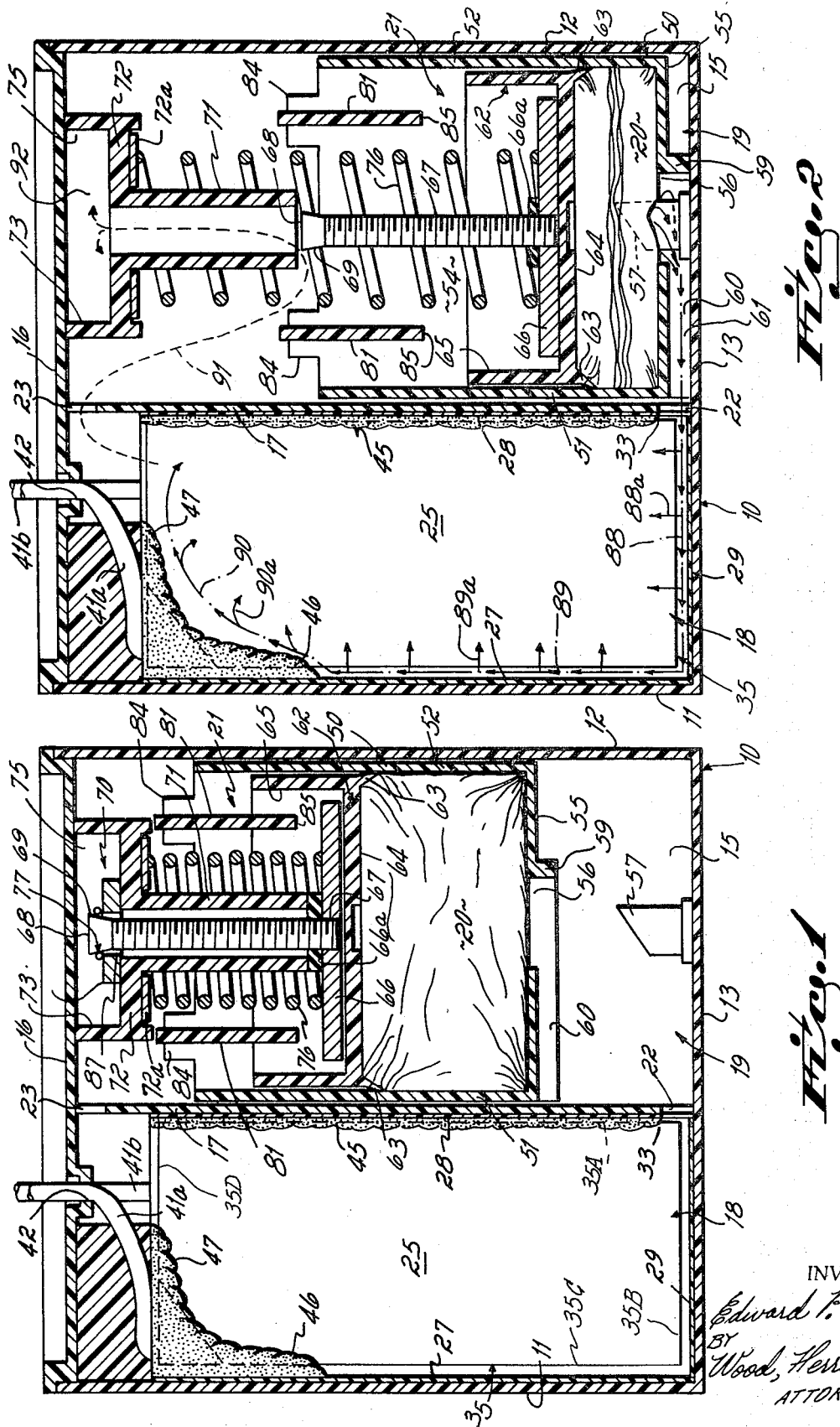
INVENTOR.
Edward P. Broglio
BY Wood, Herron & Evans
ATTORNEYS

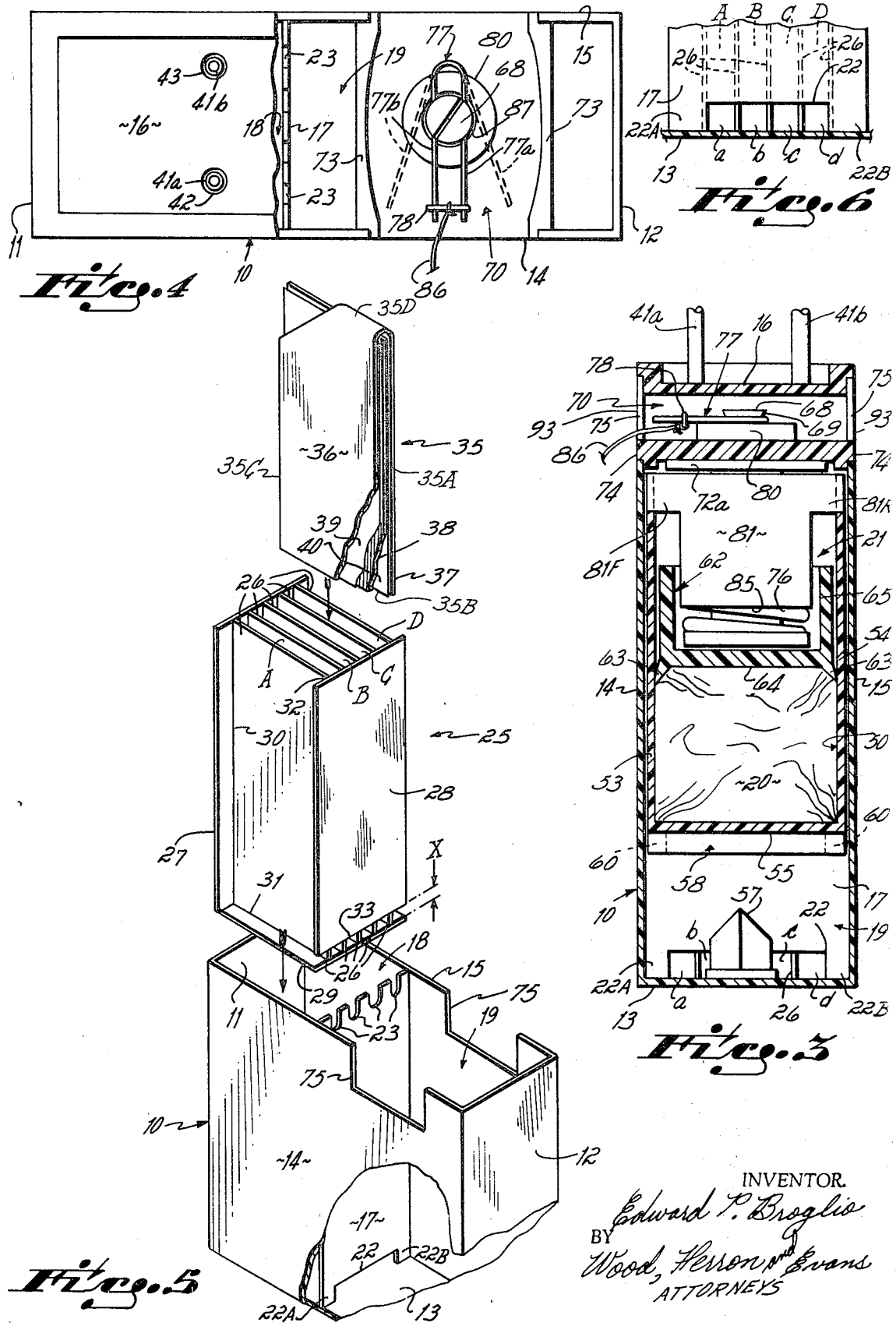

3,516,869
DEFERRED-ACTION BATTERY

Edward P. Broglio, Joplin, Mo., assignor to Eagle-Picher Industries, Inc., Cincinnati, Ohio, a corporation of Ohio
Filed Dec. 13, 1968, Ser. No. 783,520
Int. Cl. H01m 21/10
U.S. Cl. 136—114                                    11 Claims

ABSTRACT OF THE DISCLOSURE

A deferred-action battery including a battery case having a partition in the interior thereof dividing the case into a first chamber in which spaced parallel planar electrodes are disposed normal to the partition and a second chamber in which is located a rupturable electrolyte-containing sack, and including a selectively operable activating assembly for rupturing the sack and causing released electrolyte to flow from the second chamber to the first chamber and thereby activate the battery.

---

This invention relates to batteries and more particularly to batteries of the deferred-action type.

Deferred-action batteries are distinguishable from other types of batteries by virtue of the fact that in the former the electrolyte, although housed within the same battery case, is maintained physically separate from the opposite polarity battery electrodes or plates until it is desired to activate the battery, that is, until it is desired to initiate the generation of electrical energy by the electro-chemical interaction of the electrolyte and electrodes. Thus, in a deferred-action battery, the elements necessary to the generation of electrical power, namely, the opposite polarity electrodes and the electrolyte, while being enclosed within the same battery case, are, prior to activation, maintained separate and, accordingly, the battery is held in an inactive state. When activation is desired, that is, when it is desired to initiate the generation of electrical energy, the opposite polarity electrodes and electrolyte are brought into operative relationship to initiate the electro-chemical interaction necessary to generate electricity.

Deferred-action batteries are useful in a variety of applications where it is desired to have a reserve or standby source of electrical energy, and other reserve or standby sources of electrical energy, such as motor-generators and the like, are not available or practical. For example, in many cases in order to cope with emergency situations, it is desirable to have a reserve or standby source of electrical energy of the deferred-action battery type. Outdoorsmen, such as hunters, boatsmen and the like, often get lost or injured and in such emergencies deferred-action batteries are desirable to provide emergency signal beacons or lights and/or radio transmissions to expedite location by rescue personnel. Deferred-action batteries are also useful in non-emergency situations such as often encountered in space vehicle and missile applications where it is desired to selectively provide, at some point in the flight of the space vehicle or missile, electrical energy for activating steering mechanisms or the like.

A deferred-action battery must satisfy a number of criteria if to be completely satisfactory as a reserve or standby source of electrical energy useful in applications of the type indicated above. For example, it is essential that the deferred-action battery be relatively inexpensive. Low cost is particularly desirable if deferred-action batteries are to be commercially accepted by outdoorsmen such as hunters and boatsmen. Such persons cannot be expected to spend large sums of money for a battery which may never be used. The deferred-action battery must also be rugged, that is, capable of withstanding mechanical shock or impact without degrading its operational reliability. For example, the deferred-action battery must be sufficiently rugged to prevent premature activation of the battery should it inadvertently be subjected to mechanical shock or impact as often occurs when used by outdoorsmen, sportsmen, etc.

It has been a principal objective of this invention to provide a battery of the deferred-action type which is rugged and reliable, and yet which is relatively inexpensive. This objective has been accomplished in accordance with certain principles of this invention by providing, in a battery having a cell case divided by a partition into a first chamber housing electrodes and a second chamber housing a sack of electrolyte rupturable when brought into contact with a stationary knife, the unique combination of a container or holder located in the electrolyte chamber in which is positioned the electrolyte sack, a biased piston means also located in the electrolyte chamber adapted to be selectively released to urge the electrolyte sack toward the knife, and a stop means cooperating with the sack holder and the piston means for limiting, prior to battery activation, movement of the sack holder, and hence the sack, relative to the knife to an amount which is insufficient to produce rupture of the sack and, hence, premature activation of the battery.

In accordance with a preferred form of the invention, the piston means includes a spring-biased piston plate mounted at one end of a piston rod, the other end of which passes through an aperture in a retaining structure fixed to the battery case which facilitates gripping of the rod and maintenance of the piston plate in an inactive position remote from the knife prior to activation. The stop means, in the preferred embodiment, takes the form of bars secured to the sack holder intermediate the piston plate and the retainer structure. In accordance with this preferred arrangement, when the piston plate is in its inactive position remote from the knife, the sack holder, by virtue of the mechanical interference between the stop bars secured thereto and the piston plate, cannot move toward the knife prior to activation to permit premature sack rupture and, hence, inadvertent battery activation. However, when activation is desired and the biased piston plate released, the stops do not interfere with the movement of the sack by the piston plate and the ultimate rupture of the sack by the knife to effect battery activation.

Another important requirement of deferred-action batteries of the type suitable in the applications noted earlier is that the electrodes be fully wetted by the electrolyte, thereby permitting complete activation of the battery, once the electrolyte is released. Such complete wetting must be independent of the particular orientation of the battery at the time of activation, that is, must occur regardless of whether the battery be resting on its side, top, or bottom at the moment of activation. Related to the requirement that the battery produce complete electrode wetting when activated, and essential in certain applications, is the further requirement that the state of complete electrode wetting be achieved as rapidly as possible after release of the electrolyte. These objectives have been accomplished in accordance with certain additional principles of the invention by providing liquid flow control means in the electrode chamber which initially limits the flow of released electrolyte entering the electrode chamber to a primary flow path which includes substantially the entire periphery of the electrodes remote from the point at which the electrolyte is entering the electrode chamber, and which substantially excludes the entire periphery of the electrodes adjacent the point at which the electrolyte is entering except that portion of the electrode periphery necessary to permit the released electrolyte to flow from the point at which it enters the electrode chamber to the included remote electrode periphery.

In a preferred form of this invention in which the electrodes have a first edge parallel to the partition dividing the battery case into two chambers, a second edge opposite the first edge, and a third edge interconnecting the first and second edges, the liquid flow control means takes the form of inert material located in the space between the first electrode edge and the partition and between a portion of the second edge remote from the third edge and wall of the electrode chamber adjacent the remote portion of the second edge. In accordance with this preferred structure, when the released electrolyte enters the electrode chamber, preferably at a point adjacent the junction between the first and third edges, the electrolyte flows along a primary path which includes the third edge and the portion of the second edge adjacent the third edge. From this primary path, which includes two adjacent electrode edges, the electrolyte then flows into the inter-electrode spaces, thereby wetting the electrodes from two directions to enhance the rate and degree of wetting. Because the space between the divider partition and the first edge of the electrode adjacent the partition is filled with an inert material, when the released electrolyte enters the electrode chamber the electrolyte does not flow up the wall of the partition and thereby impede proper distribution of the electrolyte and wetting of the electrode.

A further requirement of a deferred-action battery, essential in many applications, is that release of the biased piston means to rupture the sack and initiate distribution of the electrolyte to the electrodes must be effected in a simple and easy manner. With piston release easily accomplished, in an emergency an injured outdoorsman in need of treatment can activate the battery, without undue difficulty, and thereby promptly initiate transmission of an emergency signal beacon or radio transmission. This objective has been accomplished in accordance with certain additional principles of this invention by a unique piston release mechanism which includes a U-shaped spring clip having legs adapted to move from an inner position in which the upper end of the piston rod is restrained against movement to an outer position in which the piston rod is released and the piston urged agaisnt the electrolyte sack; and a ring-shaped trigger clip adapted to slideably engage the free ends of the U-shaped spring clip to maintain the legs thereof in their inner piston-holding position, which is disengageable from the U-shaped clip by the mere application of slight force to the trigger in a direction parallel to the legs of the U-shaped clip. Thus, by virtue of a simple U-shaped spring clip and ring-shaped trigger, a piston release mechanism is provided which is extraordinarily simple to operate, yet inexpensive and reliable.

Other objectives and advantages of this invention will be more reodily apparent from a detailed description of the invention taken in conjunction with the accompanying drawings in which:

FIG. 1 is a vertical cross-sectional view of the battery taken along the longitudinal center showing the battery activating assembly in the inactive position.

FIG. 2 is a cross-sectional view similar to FIG. 1 showing the battery activating assembly in the activated position.

FIG. 3 is a vertical cross-sectional view taken along the transverse center line of the activating assembly of the battery showing the battery activating assembly in the inactive position.

FIG. 4 is a top view partially broken away of the battery.

FIG. 5 is a diagrammatic exploded view of the electrode assembly and partitioned battery case.

FIG. 6 is a vertical cross-sectional view of a portion of the battery showing the partition slot and the ports through which the electrolyte flows from the electrolyte chamber to the electrodes to effect activation.

The deferred-action battery, in accordance with a preferred embodiment of this invention, includes a battery case or container 10 having integral left and right side walls 11 and 12, a bottom 13, and front and rear walls 14 and 15. The battery case 10 also includes a cover 16 having its marginal portion or edge configured to snugly interfit with the upper edges of the case sides and walls 11, 12, 14 and 15. Positioned within the battery case 10 is a partition or separator panel 17 which is secured in place in the position shown by means of adhesive (not shown) applied to the vertical edges thereof to cause the same to adhere to the inner walls of the front and back 14 and 15 of the battery case 10. The partition 17 divides the interior of the battery case 10 into a left-hand compartment 18 (as viewed from FIG. 1) which houses a charged electrode assembly 25 to be described, and a right-hand chamber 19 which houses an electrolyte sack 20 and an activating assembly 21 also to be described.

The partition 17 has a horizontal slot 22 formed in the bottom thereof which, except for the two pillars 22A and 22B adjacent the case front 14 and rear 15 used for vertical positioning, extends substantially across the entire length of the partition bottom from the inner surface of the case front 14 to the inner surface of the case back 15. The slot 22 permits electrolyte to enter the chamber 18 in which the charged electrode assembly 25 is housed when the battery is activated by rupture of the electrolyte sack 20.

The partition 17 also includes one or more vent ports 23 formed in the upper edge thereof for permitting gas, which is generated by the interaction of the electrolyte and the electrodes of the assembly 25 when the battery is activated, to be vented from the chamber 18. Gas venting prevents, during activation, development of back-pressure in chamber 18. Such back-pressure impedes distribution of the electrolyte, preventing rapid and complete electrode wetting and in turn satisfactory activation.

The battery case 10 and partition 17 may be fabricated of any material inert to the chemical action of the battery and its environment. For example, the battery case 10 and partition 17 may be fabricated of plastics, preferably, an acrylonitrile-buta-styrene polymer.

The electrode assembly 25, which in use is positioned within the chamber 18 of the battery case 10, includes a plurality of adjacent cell chambers A, B, C and D as best shown in the central portion of FIG. 5. The cell chambers A–D are formed by identical spaced parallel, vertically disposed walls 26 which constitute the front and rear cell chamber panels or partitions, a left side panel 27, a right side panel 28 and a bottom panel 29. The left edges 30, bottom edges 31 and right edges 32 of the walls 26 are adhered to the left panel 27, the bottom panel 29 and the right side panel 28 by suitable adhesive inert to the chemical action of the battery. The bottom edge 33 of the right side panel 28 is spaced from the bottom panel 29 by a distance X which in practice is equal to the height of the slot 22 formed in the bottom of the partition 17. With the lower edge 33 of the side panel 28 so spaced from the bottom panel 29, ports a, b, c and d are provided in the lower sections of the cell chambers A, B, C and D through which electrolytes can enter when the battery is activated. The ports a, b, c and d collectively are coextensive with the slot 22 such that electrolyte from sack 20 entering chamber 18 via slot 22 is not diverted from chambers A, B, C and D.

Panels 26–29 forming chambers A–D can be fabricated of suitable material inert to the chemical action of the battery, such as, films of polyethylene terephthalate resins. Positioned within each of the cell chambers A, B, C and D is an identical electro-chemical couple 35, having a right-hand edge 35A, a bottom edge 35B, a left-hand edge 35C, and a top edge 35D, as best shown in the upper portion of FIG. 5. Each couple includes a pair of negative plates or electrodes 36 and 37 electrically connected at their upper right-hand corner, and a positive plate or electrode 38 positioned between the negative plates. For reasons to become apparent hereafter, the upper left-hand corners of the negative plates 36 and 37 of each couple 35 is preferably removed. The couple 35 further includes two layers of conventional battery separator material 39 and 40 which are interposed on either side of the positive plate 38 between the positive plate and the negative plates 36 and 37. The separator material 39 could be fabricated of, for example, filter paper. The positive plates 38 of the couples 35 are connected in parallel by suitable means (not shown), as are the negative plates 36, 37 of the couples. The parallel-connected positive and negative plates are then externally connected to an electrical load (not shown) by positive and negaleads 41a and 41b which pass through suitably provided apertures 42 and 43 formed in the cover 16 of the battery case 10.

For reasons to become apparent hereafter, the space in each of the cell chambers A, B, C and D existing between the right-hand edges 35A of the couple elements 36–40 and the inner surface of the right side panel 28 is filled with suitable material 45 inert to the electro-chemical action of the battery. Likewise, the space in each of the cell chambers A, B, C and D between the left-hand edges 35C of the couple elements 36–40 and the inner surface of the left side panel 27 is filled, throughout approximately the upper one-third of the vertical dimension of the couples 35, with suitable material 46 inert to the electro-chemical action of the battery. Finally, the space in each of the cell chambers A, B, C and D between the upper edges 35D of the couple elements 36–40 and the upper edges of the panels 26, 27 and 28 is filled, throughout approximately the left-hand one-half of the horizontal dimension of the couples 35, with suitable material 47 inert to the electro-chemical action of the battery. The inert material 45, 46 and 47 may, for example, be an asphaltic tar of the type used in sealing batteries; rubber cement; or silicone potting compounds such as marketed by General Electric Company under the designation RTV.

The width of the electrode assembly 25, that is the distance between the outer surfaces of the front and rear panels 27 and 28, is selected to provide, when the electrode assembly 25 is inserted in the left chamber 18, a snug fit between the outer surfaces of the side panels 27 and 28 and the inner surfaces of the battery case side 11 and the partition 17. Additionally, when the electrode assembly 25 is inserted in the chamber 18, the bottom surface of the bottom panel 29 is in contact with the upper surface of the cell bottom 13. Finally, when the electrode assembly 25 is inserted in the chamber 18, the space between the outer-most panels 26 and the front and rear walls 14 and 15 of the cell case is filled with a suitable spacer material (not shown), such as foam plastic, wood, or the like. With the electrode assembly 25 so positioned in the chamber 18, when the battery is activated and electrolyte from the sack 20 is released, electrolyte entering the left chamber 18 through the slot 22 is limited to entering the chambers A, B, C and D via ports a, b, c and d and is precluded from entering any part of the chamber 18 which is exterior to the cell chambers A, B, C and D. Thus, released electrolyte is assured of entering only the cell chambers A–D.

The activating assembly 21, which is housed within the chamber 19 of the battery case 10, includes an electrolyte sack holder 50 having a generally rectangular horizontal cross-section defined by left and right sides 51 and 52 and front and rear walls 53 and 54. The electrolyte sack holder 50 also includes a rectangular bottom 55 formed integral with the sides 51 and 52 and the front and rear walls 53 and 54. Formed in the central portion of the bottom 55 of the electrolyte sack holder 50 is an aperture 56, through which a knife 57 secured to the bottom 18 of the cell case 10, is adapted to pass and puncture or rupture the electrolyte sack 20 when the battery is activated in a manner to be described.

Extending downwardly from, and formed integral with, the lower surface of the bottom 55 of the electrolyte sack holder 50 is a U-shaped ridge 58. The ridge 58 has its central portion 59 partially enclosing the aperture 56, and its legs 60 opening toward the slot 22 formed in the partition 17 to form a throat which is substantially coextensive with the slot 22. The U-shaped ridge 58, in combination with the upper surface of the bottom 13 of the chamber 19 and the lower surface of the bottom 55 of the electrolyte sack holder 50, forms, when the electrolyte sack holder is in its lower-most position (see FIG. 2), a fluid passage 61 between the aperture 56 and the slot 22 through which electrolyte from the punctured sack 20 can pass into the cell chambers A, B, C and D of the electrode assembly 25.

Positioned within the upper portion of the electrolyte sack holder 50 above the electrolyte sack 20 is a piston 62. The dimensions and horizontal cross-section of the piston 62 are selected such that a snug fit is provided between the outer lower periphery of the piston and the inner wall of the electrolyte sack holder 50. Preferably, the outer and lower peripheral edge of the piston 62 is provided with an outwardly and downwardly extending integral flexible lip 63 which forms a fluid type seal between the inner surfaces of the walls 51, 52, 53 and 54 of the electrolyte sack holder 50 and the bottom surface 64 of the piston 62.

Located within a recess 65 formed in the upper portion of the piston 62 is a flat piston plate 66 which bears against the upper surface of the piston bottom 64 during activation. Extending upwardly from the piston plate 66 is a piston rod 67, preferably in the form of a screw, which has its lower portion threadedly engaged with the piston plate 66 and its upper portion or head 68 provided with an upwardly and outwardly flaring cam surface 69.

The activating assembly 21 further includes a retainer structure 70 provided with a lower cylindrical portion 71 which surrounds substantially the entire length of the threaded portion of the rod 67. Also forming part of the retainer structure 70 are a horizontal retainer surface 72 and a pair of vertical side walls 73. The front and rear edges of the side walls 73 and of the retainer surface 72 have a flange 74 which extends through and engages the vertical and horizontal edges of rectangular slots 75 formed in the upper marginal edge portions of the front and rear walls 14 and 15 of the cell case.

Interposed between the bottom of the retainer surface 72 and the upper surface of the piston plate 65 is a bearing washer 72a, compressing spring 76, and a sealing washer 66a. The spring 76 is adapted to be maintained, prior to activation, in a compressed condition (shown in FIG. 1) by means of a U-shaped keeper 77 and a trigger 78 (FIG. 4). The keeper 77 is formed of spring wire stock and configured such that the legs 77a and 77b thereof are parallel under normal conditions, that is, with the keeper 77 in a relaxed condition. Such parallel relation of legs 77a and 77b is maintained when the keeper 77 is positioned about the head 68 with its legs in contact with cam surface 69, as shown in solid lines in FIG. 4, by a ring-shaped trigger 78 which is adapted to fit over the free ends of the keeper legs. When the trigger 78 is disengaged from the keeper legs 77a and 77b, as by pulling on a cord 86 secured to the trigger, the cam surface 69 of the head 68 temporarily urges the keeper legs to the outer position shown in dotted lines in FIG. 4 as the head moves downwardly under the action of the spring 76, thereby disengaging the keeper and head to release the spring-biased piston. With the keeper 77 maintained in the solid line position (FIG. 4) by the inter-engagement of the trigger 78 and the free ends of the keeper legs 77a and 77b, the central portions of the keeper legs 77a and 77b are positioned between the cam surface 69 of the piston rod head 68 and a retaining washer 80 which seats on the retaining surfaces 72 of the retainer structure 70, preventing downward movement of the piston rod 67 and in turn maintaining the spring 76 compressed.

To prevent electrolyte sack holder 50 from moving downwardly when the piston plate 66 is in the inactive position shown in FIG. 1, thereby prematurely puncturing the electrolyte sack 20, a pair of piston stops 81, 81 are provided. As seen in FIG. 3, the piston stops 81, 81 are generally T-shaped having frontwardly and rearwardly extending ears 81F and 81R which are interlocked in suitable slots provided in the upper edges of extensions 84 formed in the front and rear walls 53 and 54 of the electrolyte sack holder 50. The vertical dimension of the piston stops 81, 81 is selected such that if the electrolyte sack holder 50 should move downwardly due to shock, impact, or the like, prior to activation of the battery, the lower edges 85 of the piston stops 81, 81 will abut the upper surface of the piston plate 66 and terminate downward motion of the electrolyte sack holder 50 relative to knife 57 prior to engagement of the knife 57 and sack 20, thereby preventing puncturing of the sack by the knife before activation of the battery.

The dimensions and spring constant of the compression spring 76 are selected such that when the trigger 78 is disengaged from the free ends of the keeper legs 77a and 77b, allowing the keeper to momentarily assume the dotted line position shown in FIG. 4 whereby the piston rod 67 is released and allowed to move relative to the retainer structure 70, the piston 62 moves downwardly to the position shown in FIG. 2, causing the knife 57 to puncture the electrolyte sack 20 and the bottom 64 of the piston to compress the electrolyte sack 20, forcing electrolyte through the aperture 56 into the cell chambers A, B, C and D via the passage 61, formed by the ridge 59, the slot 22, and the ports $a, b, c$ and $d$.

The non-metallic elements comprising the activating assembly 21, except for the piston 62, preferably are fabricated of a suitable plastic material inert to the chemical action of the battery environment and electrolyte, such as an acrylonitrile-buta-styrene polymer. The piston 62 is preferably fabricated of an inert plastic different from that of the remaining nonmetallic elements of the activating assembly 21, such as polyethylene. This enables those portions of the activating assembly 21, such as ears 81F, 81R and extensions 84, and flange 74 and slots 75, which are adhered together by suitable adhesive to be assembled without inadvertent adhering of the piston 62 to the holder 50.

In operation, with the battery assembled as shown in FIG. 1 so that the piston plate 66 is maintained in the inactive position by the keeper 77 and the trigger 78, the downward motion of the piston 62 is limited by the clearance between the upper surface of the piston plate 66 and the lower edge 85 of the piston stops 81. This clearance is insufficient, as indicated earlier, to enable the piston 62 to move downwardly a distance sufficient to urge the electrolyte sack 20 into engagement with the knife edge 57, thereby preventing premature puncture of the electrolyte sack 20.

Should it be so desired to activate the battery, the trigger 78 is removed from engagement with the free ends of the keeper legs 77a and 77b, for example, by pulling the cord 86 attached to the trigger 78. This enables the keeper 77 to momentarily assume the dotted line position shown in FIG. 4 as the head 68 of the piston rod 67 moves downwardly under the action of the compression spring 76, thereby releasing the spring-biased piston plate 66. As the piston plate 66 moves downwardly, head 68 passes downwardly through an aperture 87 formed in the retaining washer 80, completely disengaging the head and keeper 77. Such disengagement permits the piston plate 66, and hence the piston 62, to continue moving downwardly under the action of the spring 76. Downward motion of the piston 62 in turn is transmitted to the electrolyte sack 20 via the piston bottom 64, causing the electrolyte sack to move downwardly, also. The downward motion of the electrolyte sack 20, in turn, imparts downward motion to the electrolyte sack holder 50 moving the latter downwardly.

The piston 62, electrolyte sack 20 and electrolyte sack holder 50 continue moving in unitary fashion downwardly until the lower edge of the ridge 58 engages the upper surface of the battery case bottom 13. At this point, the electrolyte sack holder 50 terminates motion, and the knife 57 punctures the sack 20, releasing the electrolyte. However, the piston 62, which is urged by the spring-biased piston plate 66, continues moving downwardly, compressing the punctured electrolyte sack 20. Compressing of the electrolyte sack 20 forces electrolyte through the aperture 56 into the passage 61 formed by the interior of the ridge 59, the bottom surface of the electrolyte sack holder bottom 55 and the upper surface of the battery case bottom 13. Continued downward motion of the piston 62 under the action of the spring-biased piston plate 66 causes the electrolyte which has entered the passage 61 to pass through the slot 22 and ports $a, b, c$ and $d$ into the cell chambers A, B, C and D.

By reason of the material 45, none of the released electrolyte entering the cell chambers A, B, C and D flows upwardly along the inner surface of side panel 28 of the electrode assembly 25 between the side panel 28 and the right-hand edges 35A of the couple elements 36–40. Accordingly, the electrolyte entering the cell chambers A, B, C and D via the slot 22 and the ports $a, b, c$ and $d$ primarily flows along path 88 defined by the upper surface of the bottom panel 29 and the bottom edges 35B of couple elements 36–40 until the inner surface of the left panel 27 is reached. At this juncture the primary direction of the electrolyte flow changes to an upward flow along path 89 defined by the inner surface of the panel 27 and the left-hand edges 35C of couple elements 36–40 until the electrolyte abuts the material 46. When the electrolyte abuts the material 46, the direction of the primary electrolyte flow changes to a flow path 90 along the lower surface of the material 47. In addition to the primary electrolyte flow paths 88, 89, and 90, the electrolyte branches out and flows in secondary paths 88a, 89a and 90a.

The primary flow paths 88, 89, and 90 in combination with the secondary flow paths 88a, 89a and 90a combine to rapidly and completely wet the electrodes 36–38 of the assembly 25. In fact, it has been found that by reason of the material 45, 46 and 47 located in the position shown, the electrode plates 36–38 are completely wetted and the battery fully activated in approximately forty milliseconds. It has been found, particularly in applications wherein the battery is activated in an environment where the pressure within the battery is less than the pressure externally of the battery, that without the material 45, 46 and 47 located as shown, the electrolyte, when forced into the cell chambers A, B, C and D via the ports $a, b, c$ and $d$, principally flows upwardly along the inner surfaces of the left panel 27 and the right panel 28 and out the vent ports 23 into the chamber 19 producing little, if any, wetting of the battery. Under such circumstances, the battery is incompletely activated. By arrangement of the material, 45, 46 and 47 in the manner shown, this problem of incomplete wetting, and hence, incomplete battery activation has been substantially eliminated.

Gas generated in cell chambers A, B, C, and D subsequent to battery activation is vented to the battery environment via path 91 (see FIG. 2) which includes ports 23, the core of cylinder 71, the aperture 87 of washer 80 should the washer still be positioned as shown, a cavity 92 above retaining surface 72, and the port 93 formed by flange 74 and the cover 16. Such venting prevents development of a back-pressure in the cell chambers A–D which would impede rapid distribution to the electrodes of the electrolyte released from the ruptured sack.

While the battery case 10 and activating assembly 21 of this invention may be utilized with a variety of electrochemical couples to rapidly and completely wet the electrodes and thereby activate the battery, this invention has been found to be particularly useful with primary batteries using magnesium (Mg) anodes, manganese dioxide ($MnO_2$) cathodes, and aqueous magnesium perchlorate [$Mg(ClO_4)_2$] electrolyte. In such an electro-chemical battery system, the cathode is preferably one inch wide, two inches high, and .032 inch thick, and fabricated of battery grade manganese dioxide on an expanded metal grid; the anode is one inch wide, two inches high, and .005 inch thick, and fabricated of commercial sheet magnesium; and the electrolyte is a 2–3½ normal aqueous solution of magnesium perchlorate.

The equation, during battery discharge governing the electro-chemical action at the cathode is:

$$2MnO_2 + 2 \text{ electrons} \rightarrow Mn_2O_3 + O^=$$

The equation, during battery discharge, governing the electro-chemical action at the anode is:

$$Mg + 2(OH)^- \rightarrow Mg(OH)_2 + 2 \text{ electrons}$$

The primary equation, during battery discharge, for the electro-chemical couple is:

$$Mg + 2MnO_2 + H_2O \rightarrow Mg(OH)_2 + Mn_2O_3$$

If desired, perchloric acid ($HClO_4$) may be added to the electrolyte to act as an anti-freeze and source of heat for low temperature battery applications.

Other electro-chemical couples can also be used. For example, a nickel-cadmium battery of the type disclosed in copending U.S. patent application for Battery Electrode Separation, Cupp et al., Ser. No. 746,475, filed July 22, 1968, the disclosure of which is incorporated herein by reference, could be utilized with this invention.

The deferred-action battery structure of this invention provides a number of unobvious advantages. For example, the existence of a liquid flow passage of only a very small cross-section between the cell chambers A–D, namely, the slot 22, limits the short-circuit path between adjacent electro-chemical couples 35 to one which is characterized by extremely high resistance. Such a high resistance short-circuit path prevents a substantial short-circuit condition from developing between the various electro-chemical couples 35 comprising the battery. It is significant that the elimination of the short-circuit problem by virtue of the extremely small cross-section passage interconnecting the cell chambers A–D has not been accomplished at the expense of the realization of rapid wetting of the electrodes once the electrolyte is released.

Another important advantage of the deferred-action battery of this invention attributable to the novel combination of structural elements incorporated therein is the ability of the battery to function in a manner such that once the electrolyte is released the electrodes are both completely, and rapidly, wetted by the electrolyte, enabling the full capacity of the active battery material to be immediately realized. A further advantage of the deferred-action battery of this invention and related to the foregoing advantage is that complete and rapid wetting of the electrodes by the electrolyte, once the electrolyte is released, is possible notwithstanding the orientation of the battery. Thus, the battery can be completely and rapidly activated when resting on its front, rear, sides or top.

A further advantage of the battery of this invention is that the activating assembly, particularly the piston means, can be quickly and easily released to produce rupture of the sack. Such is accomplished by merely applying a small force to the trigger ring in the direction necessary to slidably disengage the trigger ring from the keeper legs which normally serve to hold the piston rod in its inactive position remote from the knife.

Having described my invention, I claim:

1. A deferred-action battery having electrodes adapted to be wetted by a liquid electrolyte comprising:
   a battery case having the interior thereof divided into at least a first chamber housing said battery electrodes and a second chamber,
   passage means for providing a liquid electrolyte flow path between said chambers,
   liquid electrolyte contained in said second chamber which is adapted to be selectively released for flow through said passage means into said first chamber,
   means in said first chamber for initially limiting the flow of said released elecrolyte to substantially a primary flow path which includes substantially that part of the electrodes' periphery remote from said passage, and which primary path excludes substantially that part of the electrodes' periphery adjacent said passage except that necessary to enable said released electrolyte to flow from said passage to said included remote periphery.

2. The battery of claim 1 wherein said battery case includes a partition which divides said case interior into said first and second chambers, wherein said passage means is across said partition, and wherein said excluded electrode periphery is located adjacent said partition and said included electrode periphery which is remote from said passage is located adjacent the interior of said first chamber opposite said partition.

3. The battery of claim 2 wherein said second chamber includes:
   (a) a rupturable electrolyte container,
   (b) a knife positioned to rupture said electrolyte container when said container and knife move relative to each other,
   (c) a holder for said electrolyte container movable relative to said knife,
   (d) piston means in said holder selectively movable relative to said knife for moving said holder and electrolyte container relative to said knife, and
   (e) stop means cooperating with said holder and said piston means for preventing said holder from moving relative to said knife sufficiently to cause said knife to rupture said electrolyte container prior to said selective movement of said piston means.

4. The battery of claim 3 wherein said piston means includes a piston plate located within said holder and a rod having one end connected to said piston plate and another end which is enlarged; said battery further including
   (a) a restraining structure fixed to said case and having an aperture therein through which said enlarged end of said piston rod is adapted to pass,
   (b) a U-shaped keeper having legs movable from an outer position to an inner position in which latter position said legs are engageable with said enlarged end of said piston rod for preventing movement of said piston rod relative to said retainer, and
   (c) a trigger ring adapted to engage said keeper legs for maintaining said keeper legs in said inner position, said trigger ring being easily disengaged from said keeper legs by sliding movement to permit said keeper legs to move to said outer position, disengaging said legs and said enlarged end of said piston rod, thereby permitting said piston plate to move said electrolyte container relative to said knife.

5. The battery of claim 4 wherein said piston rod is disposed substantially parallel to the direction of movement of said piston plate, wherein said piston plate is disposed substantially normal to said piston rod, and wherein said stop means is fixed to said holder and disposed between said piston plate and said retaining structure.

6. The battery of claim 2 wherein said electrodes are substantially planar and disposed substantially normal to said partition, and wherein said passage communicates directly with only a relatively small portion of a specified edge of said electrodes which is adjacent said passage, and wherein the remainder of said specified edge of said electrodes comprises said excluded electrode periphery.

7. The battery of claim 6 wherein said first chamber is divided into individual electrolyte impermeable cell chambers each housing sufficient electrodes to form an electro-chemical couple, said cell chambers each having a port located adjacent said passage and said relatively small portion of said specified edge of said electrodes, said ports collectively being substantially coextensive with said passage to limit released liquid electrolyte in said passage to flow into said cell chambers via said ports.

8. A deferred-action battery comprising:
a battery case having an interior,
a partition in said case dividing said case interior into at least a first chamber and a second chamber,
a plurality of planar electrodes in said first chamber disposed substantially parallel to each other and normal to said partition, said electrodes each having a first edge located adjacent said partition, a second edge opposite said first edge, and a third edge connecting said first and second edges,
passage means for providing a liquid flow path across said partition, said passage means being in direct liquid contact with the junction formed by said first and third edges,
liquid electrolyte contained in said second chamber which is adapted to be selectively released for flow through said passage means into said first chamber,
flow control means in said first chamber for initially substantially limiting the flow of released electrolyte from said passage to a primary flow path which includes substantially all said third edge and the major portion of said second edge located adjacent said third edge, said primary flow path substantially excluding said first edge.

9. The deferred-action battery of claim 8 wherein said flow control means includes inert material located between said partition and said first electrode edges and between the minor portion of said second electrode edges and the interior of said cell case adjacent said minor portion of said second electrode edges.

10. The deferred-action battery of claim 8 wherein said planar electrodes further includes a fourth edge located opposite said third edge, and wherein said primary flow path substantially excludes a section of said fourth edge located adjacent said second edge.

11. The deferred-action battery of claim 10 wherein said flow control means includes inert material located between said partition and said first electrode edges, between the minor portion of said second electrode edges and the interior of said cell case adjacent said minor portion of said second electrode edges, and at said section of said fourth edges.

References Cited

UNITED STATES PATENTS

| | | | |
|---|---|---|---|
| 3,178,316 | 4/1965 | Wilke | 136—112 |
| 3,222,225 | 12/1965 | Amiet et al. | 136—114 |

WINSTON A. DOUGLAS, Primary Examiner

C. F. LEFEVOUR, Assistant Examiner

U.S. Cl. X.R.

136—90